Figure 1:
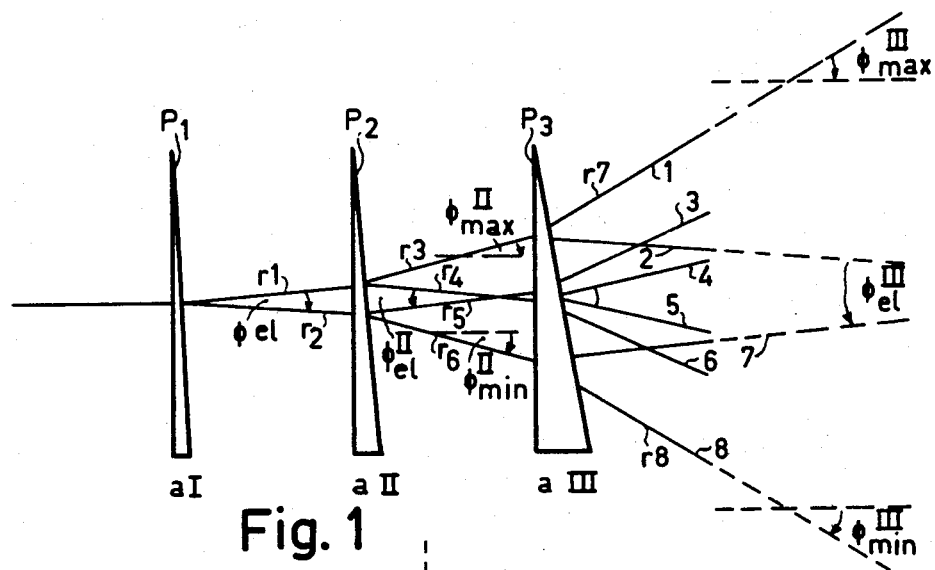

United States Patent
Schröder

[11] 3,976,360
[45] Aug. 24, 1976

[54] PRISM ARRANGEMENT FOR DIGITAL ELECTRO-OPTICAL LIGHT DEFLECTION SYSTEMS

[75] Inventor: Eckhard Schröder, Henstedt-Ulzburg, Germany

[73] Assignee: U.S. Philips Corporation, New York, N.Y.

[22] Filed: Oct. 29, 1974

[21] Appl. No.: 518,225

[30] Foreign Application Priority Data
Nov. 2, 1973  Germany............................ 2354892

[52] U.S. Cl............................. 350/150; 350/DIG. 2; 350/157
[51] Int. Cl.²........................................... G02F 3/00
[58] Field of Search................. 350/DIG. 2, 150, 157

[56] References Cited
UNITED STATES PATENTS
3,482,899   12/1969   Schmidt............................. 350/150
3,572,895   3/1971    Schmidt et al.................. 350/150 X OTHER PUBLICATIONS
U. J. Schmidt et al., "Temperature Stabilization of the Deflection Pattern of a Digital Light Deflector Containing Single Prisms", *Opto-Elctronics*, vol. 2, No. 1, Feb. 1970, pp. 29–35.

*Primary Examiner*—John K. Corbin
*Assistant Examiner*—Richard A. Rosenberger
*Attorney, Agent, or Firm*—Frank R. Trifari; Simon L. Cohen

[57] ABSTRACT

The invention relates to a deflection prism arrangement for the formation of a dot pattern for digital electro-optical light deflectors, e.g. laser light deflectors, in which the prism angle of each of the sequence of prisms is doubled, the prism apex angle of the double-refracting prisms with larger prism angles being intersected in such a way by the plane in which optic axis of the prism is disposed, which axis is perpendicular to the system axis, that the two partial angles formed with the optic axis of the relevant prism have a ratio between approximately ⅔ and ¾.

4 Claims, 3 Drawing Figures

PRISM ARRANGEMENT FOR DIGITAL ELECTRO-OPTICAL LIGHT DEFLECTION SYSTEMS

The invention relates to a prism arrangement for the formation of a dot pattern for digital electro-optical light deflection systems, the refracting angle of each following prism of a series of prisms which are disposed in line being twice that of the preceding prism.

Such an electro-optical light deflection system consists of an alternating sequence of electrode pairs and double-refracting prisms. Between the electrodes of each pair a Kerr-liquid is disposed, which also surrounds all prisms. The Kerr cell (which comprises an electrode pair and Kerr liquid) serves as a polarization switch, which must switch the direction of polarization of the laser beam between two orthogonal states of polarization, so that in the prism which follows the relevant Kerr cell the beam is refracted as extraordinary beam in the one case and as ordinary beam in the other case. Thus, each stage enables the digital control of two directions; consequently, N stages disposed after each other yield $2^N$ directions. When the refracting prism angles are suitably selected said directions enclose equal angles.

The first prism has the smallest refracting angle and yields a splitting angle, which is referred to as elementary angle of the angular pattern. This is the angle between each time two adjacent directions in the overall directional pattern. The pattern after the first prism, which consists of images from two directions, is doubled in the next prism, so that the directional pattern now consists of images from four directions. To ensure that the angles between said four directions are equal, the refracting angle of the two prisms should have a certain value. In the case of small refracting angles, it is sufficiently accurate when the refracting angles are doubled. For larger angles, however, the non-linear properties of the law of refraction necessitate a more accurate calculation of the prism. Aberrations will then occur, which reveal themselves in the total angle which is enclosed by the images forming the pattern that is not an integral multiple of the elementary angle.

When using light beams of different wavelength, the total pattern will move away from the refracting edge of the prism when the wavelength changes from one color to another, e.g. from blue to red, and relative splitting angles of the pattern decrease when the color of the light changes, e.g. from blue to red.

Apart from these two effects another effect is associated with prisms having larger refracting angles. In the case of a prism arrangement calculated for red light, it appears that the splitting angle for blue light is only slightly greater than that for red light, but only as far as the prism whose refracting angle is smaller than one hundred times the value of the refracting angle of the first prism. In the case of prisms with larger refracting angles the splitting angle for blue light exhibits increasing deviations, because the aberrations, which are more marked at larger refracting angles, also give a dispersion effect.

The disturbing dispersion effects on the one hand modify the image pattern as a whole in such a way that the pattern is tilted and expanded, and on the other hand they modify the internal structure of the pattern through aberrations. While in the first case, which is referred to as linear dispersion, correction is possible by optical components outside the prism arrangement, it is necessary in the second case, to be denoted by aberration dispersion hereinafter, to intervene in the prism arrangement itself.

It is an object of the invention to provide a color-corrected prism arrangement for the electro-optical light deflection systems mentioned in the preamble, the aberration dispersion being eliminated for at least two colors, so that the patterns which are now identical are made to coincide on the display screen with the aid of a known technique using special color-correcting imaging lenses.

This is achieved in that in the case of double-refracting prisms with larger refracting angles the plane in which the optic axis is disposed, which axis is perpendicular to the system axis, intersects the apex angle of the prism in such a way that the ratio of the two partial angles formed with the optic axis of the relevant prism lies between approx. ⅔ and 3/4, the partial angles of at least one of the larger refracting prisms having a non-unity ratio. The prisms are tilted to the system axis, while the vertical position of the optic axis is maintained, the tilting angle being used as aberration variable.

As a result, coinciding dot patterns can be formed on the display screen for the individual colors of the deflection light beam.

Figure 2:
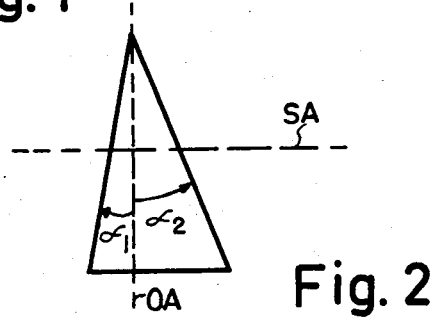
Figure 3:
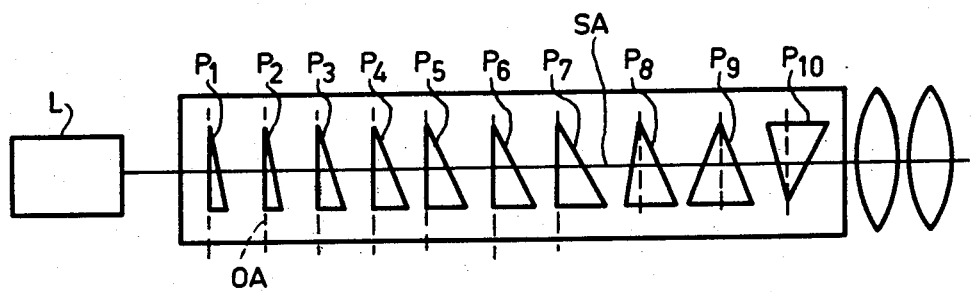

The invention will be described with reference to the accompanying drawing, in which:

FIG. 1 shows a part of a prism arrangement in explanation of the operation of said embodiment, FIG. 2 shows a prism with two different partial angles, and FIG. 3 shows a complete prism arrangement.

According to FIG. 1 the first prism $P_1$ of the deflection system which consists of three prisms $P_1$, $P_2$ and $P_3$ has the smallest refracting angle $\alpha_I$ and a splitting angle $\phi_{el}$, which is referred to as elementary angle of the angular pattern. This is the angle between two adjacent directions $r_1$, $r_2$ in the total directional pattern. The directional pattern after the first prism $P_1$, which comprises the two directions $r_1$, $r_2$ is now doubled in the second prism $P_2$ having the angle $\alpha_{II}$, so that the directional pattern now consists of four directions $r_3$, $r_4$, $r_5$, $r_6$. In order that said four directions enclose the same mutual angle, the refracting angle $\alpha_{II}$ should have a specific value. When the angle between the two component patterns, which each consist of two directions, is denoted by $\phi_{el}{}^{II}$, the angle $\alpha_{II}$ must be calculated so that the angle $\phi_{el}{}^{II}$ exactly equals $\phi_{el}$. At smaller refracting angles this is so with sufficient accuracy when the refracting angle $\alpha_{II}$ equals $2\alpha_I$. At larger refracting angles aberrations occur and the total angle of the directional pattern will not be an integral multiple of the splitting angle $\phi_{el}$. It is true that a refracting angle might be found at which said aberration does not occur, but the joining angle in the case of pattern doubling by said prism is not exactly equal to the given splitting angle $\phi_{el}$. The joining angle after a prism is constituted by the marginal directions of the directional pattern which is incident on said prism, e.g. in FIG. 1 by the directions $r_3$ and $r_6$ for the prism $P_3$.

The individual directions of the directional pattern are determined by three refractive indices, viz. the ordinary refractive index ($n_o$) and the extraordinary refractive index ($n_{ao}$) of the prism, and the refractive index of the surrounding medium (e.g. nitrobenzene). Said three refractive indices exhibit the usual wavelength dispersion, which means that they decrease at increasing wavelength.

The deviation of the laser beam relative to the optical axis of the system and thus the position of the complete pattern is mainly determined by the differences $\Delta n_{ao}$ and $\Delta n_o$. As a result, dispersion effects occur which result in the complete pattern moving away from the refracting side of the prism when the wavelength of the deflection light beam changes from blue to red, and the relative splitting angles of the pattern decreasing when the light changes from blue to red.

The angle $\phi_{min}$ and the angle $\phi_{max}$ represent the respective marginal pattern directions for each prism. A comparison between $\phi_{min}$ and $\phi_{max}$ for red and blue light reveals the aforementioned tilting of the complete pattern: the $\phi_{max}$ values for blue light are greater, but the $\phi_{min}$ values are smaller than the corresponding values for red light. This applies in any case to the pattern angles after the prisms $P_1 \ldots P_9$ (FIG. 3). After the tenth prism $P_{10}$ said effect may already be corrected, namely by placing the tenth prism $P_{10}$ "upside down" in comparison with the other prisms. When the laser beam, which generates the angle $\phi_{max}$ after each prism is refracted as extraordinary beam in the prisms $P_1 \ldots P_9$, it wll be refracted as ordinary beam by the prism $P_{10}$; as the sum of the angles of the preceding prisms is approximately equal to the angle of the prism $P_{10}$, the dispersion which is different for the ordinary beam and the extraordinary beam is thus substantially compensated.

Apart from said dispersive change of the absolute position of the complete pattern, however, the relative splitting angle also changes. The sum of $\phi_{min}$ and $\phi_{max}$ as well as the splitting angle $\phi_{el}$ is greater for blue light than for red light.

The refracting angles are calculated so that in the case of pattern doubling the two component patterns are joined with exactly the given elementary angle. Although said component patterns do not form a perfect equidistant directional pattern owing to aberrations the patterns still join correctly behind each prism. When light of a different wavelength is passed through such a prism arrangement, all angles are a fixed percentage smaller or greater at small refracting angles, without the occurrence of any substantial aberration. However, in the case of larger refracting angles with increasing aberrations accurate joining of the component patterns is no longer automatically ensured. The joining angle is the location in the directional pattern where the effect of the aberrations is strongest, because the joining angle in the case of pattern doubling by a prism is always formed by the marginal directions $r_3, r_6$ and $r_7, r_8$ of the incident pattern $\phi_{min}$ and $\phi_{max}$ respectively, i.e. by the directions for which the aberrations are strongest.

While for linear dispersion a correction by optical components outside the prism arrangement is possible, it is necessary to intervene in the prism arrangement itself in the case of aberration dispersion.

If each prism of the light deflection system were replaced by a Wollaston prism, which consists of two component prisms with the same refracting angles, which externally form a plane-parallel plate but which still have a prismatic action because the optic axes of the two component prisms are perpendicular to each other, each beam will pass the first component prism as ordinary beam and in refracted in the second component prism as extraordinary beam, and vice versa. This would also enable correction of the aberration dispersion, but in that case the number of prisms per light deflection system is doubled, so that this solution would have technological drawbacks, e.g. the necessity of accurate alignment of the individual prisms and loss of light.

When for a prism, in addition to the requirement that for the given angles of incidence and the given wavelength the joining angle should equal the elementary angle $\phi_{el}$, a second requirement is to be met for the joining angle at a second wavelength, a second variable is required.

In FIG. 2 the plane in which the opticl axis OA is disposed, is shown to be perpendicular to the system axis SA, but the geometrical position of the prism P is not. Therefore, the ratio between the agles $\alpha_1$ and $\alpha_2$ may be used as the additional variable.

When the two marginal directions of the pattern which is e.g. incident on the prism $P_9$ (FIG. 3) are assumed to be fixed, the total angle $\alpha_1 + \alpha_2$ can be calculated for different ratios $\alpha_1/\phi_1 + \phi_2$ in such a way that the desired joining angle is always obtained for e.g. the red light. When, moreover, the joining angle obtained for blue light is shown each time it appears that the lastmentioned angle and thus the aberration dispersion also depends on the ratio $\alpha_1/\alpha_1 + \alpha_2$. When as an example a prism arrangement calculated for red light ($\lambda = 647$ nm) is taken, $\alpha_l$ being 4.5 feet and $\phi_{el}$ being 0.000147 (measured in radians), there will be a location $\alpha_1/\alpha_1 + \phi_2 = 0.515$, where $\phi_{el}$ (blue) has the desired valve for blue. With the aid of the new prism $P_9$ thus found, the outer angles, which form the joining angle after the next prism $P_{10}$, can be determined and this determination is repeated for the prism $P_{10}$. Thus a new prism arrangement can be determined and calculated respectively, which no longer exhibits aberration dispersion.

In FIG. 3 such a prism arrangement, through which a beam from the laser L passes, for example consists of the prism $P_1 \ldots P_{10}$, which are disposed in line and of which the prisms $P_1 \ldots P_7$ are orthogonal and the prism $P_1$ has a refracting angle of approximately 4.5 feet, which angle is doubled in each subsequent prism. The optical axis OA of the prism $P_1 \ldots P_7$ is parallel to the face of the relevant prism on which the laser beam is incident, so that here the angle $\alpha_1$ is zero and the angle $\alpha_2$ equals the refracting angle. For the prism $p_8$ the ratio between the two angles $\alpha_1$ and $\alpha_2$ is approximately 2 : 3. The prism face on which the laser beam is incident is disposed relative to the system axis A with a corresponding inclination. For the prism $P_9$, whose refracting angle is doubled relative to the prism $P_8$, the ratio of the angle is approximately 1 at a corresponding inclination of the prism faces, while the prism $P_{10}$, as explained hereinbefore, is disposed "upside down" and the ratio of the angles $\alpha_1/\alpha_2$ is again approximately ⅔. In the Figure the polarization switches disposed between the prisms have been omitted for clarity.

A calculation of the angular patterns in the intermediate colors green ($\lambda = 521$ nm) and yellow ($\lambda = 568$ nm) reveals that also in these cases, and thus for substantially the entire visible spectrum, the aberration dispersion is reduced to deviations of less than 0.3 % of the elementary angle $\phi_{el}$.

What is claimed is:

1. A prism arrangement for the formation of a dot pattern for digital electro-optical light deflection systems, in which the refracting angle of each successive prism of a series of prisms which are disposed in line, is twice that of the preceding prism, wherein for a double-refracting prism with a refracting angle sufficiently large to cause aberrations the prism apex angle is intersected by the plane containing the optic axis of the prism, which axis is perpendicular to the system axis, in such a way that the ratio of the two partial angles formed with the optic axis of the relevant prism ranges between approximately 2/3 and 4/3, at least one of said double refracting prisms with refracting angles sufficiently large to cause aberrations having a non-unity partial angle ratio.

2. A prism arrangement as claimed in claim 1, wherein the prisms with a prism angle up to 5° are orthogonal prisms, whose optic axis is disposed in the prism face which faces towards the light source and is perpendicular to the system axis, and in which the prism face of the following prisms which faces towards the light source encloses an angle with the system axis, the optic axis of each of said following prisms remaining perpendicular to the system axis.

3. A digital light deflection system comprising a prism arrangement as claimed in claim 1.

4. A digital light deflection system comprising a prism arrangement as claimed in claim 2.

* * * * *

UNITED STATES PATENT AND TRADEMARK OFFICE
CERTIFICATE OF CORRECTION

PATENT NO. : 3,976,360
DATED : August 24, 1976
INVENTOR(S) : ECKHARD SCHRODER

It is certified that error appears in the above-identified patent and that said Letters Patent are hereby corrected as shown below:

In the Abstract, line 11, "3/4" should be --4/3--;

Col. 2, line 19, "3/4" should be --4/3--;

Col. 3, line 67, "in" first occurence should be --is--;

Col. 4, line 21, "$\alpha_1/\phi_1 + \phi_2$" should be --$\alpha_1/(\alpha_1 + \alpha_2)$--;

line 26, "$\alpha_1/\alpha_1 + \alpha_2$" should be --$\alpha_1/(\alpha_1 + \alpha_2)$--;

line 30, "$\alpha_1/\alpha_1 + \phi_2$" should be --$\alpha_1/(\alpha_1 + \alpha_2)$--;

line 50, "A" should be --SA--;

Signed and Sealed this

Twenty-sixth Day of October 1976

[SEAL]

Attest:

RUTH C. MASON
Attesting Officer

C. MARSHALL DANN
Commissioner of Patents and Trademarks